Sept. 18, 1945.  W. C. PETERS  2,385,159

LOCK NUT

Filed July 17, 1943

Inventor
WALTER CLAY PETERS.
By: Francis E. Boyne
ATTORNEY.

UNITED STATES PATENT OFFICE 2,385,159

LOCK NUT

Walter Clay Peters, Horley, England

Application July 17, 1943, Serial No. 495,104
In Great Britain October 23, 1942

2 Claims. (Cl. 151—15)

This invention relates to lock nuts, and its object is to provide a nut which will hold against inadvertent longitudinal displacement on a screw threaded stem without injury to the screw thread of either the stem or the nut.

In the present invention a split screw threaded ring is employed to lock a nut, but the ring is normally inseparable from the nut and the entire lock nut is applied as a single unit to a screw threaded stem.

The lock nut according to the invention, consists of a nut having within one end of its screw threaded aperture an annular groove, overhanging and containing a split ring formed with an internal screw thread in continuation of the screw thread of the nut but displaced eccentrically and closed to present a screw threaded aperture of smaller diameter, with means preventing rotation of the ring in the nut. When the nut is screwed on a screw threaded stem, the split ring, owing to its smaller internal diameter, becomes slightly expanded in diameter by the screw threaded stem which it therefore tightly clasps, thus producing the locking effect.

Preferably the split ring has a rounded periphery and the groove has a correspondingly rounded base at the radially outermost surface, and such rounded periphery of the ring and rounded base surface of the groove mutually firmly contact when the ring is expanded by a screw threaded stem, for instance a bolt or stud, of standard tolerated or less diameter.

A representative example of a locking nut according to the invention is illustrated on the accompanying drawing, in which—

Figure 5:
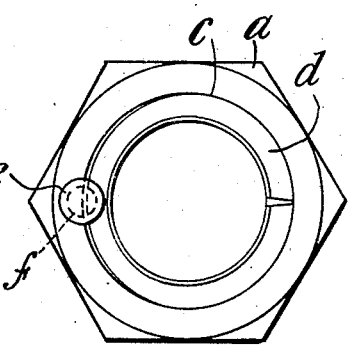
Fig. 5 is a corresponding plan.
Figure 4:
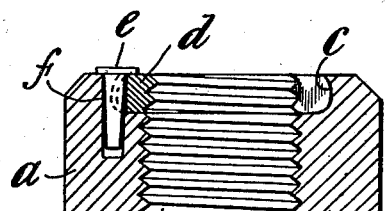
Fig. 4 is an axial section of a nut with a split ring assembled in an overhanging groove at one end of its aperture, and after both the nut and the split ring have been tapped with a screw thread and the split ring has been secured against rotation and displaced eccentrically and closed by an axial pin.

The finished locking nut shown in Figs. 4 and 5 comprises a nut $a$ having within one end of its screw threaded aperture $b$, an annular groove $c$. The annular groove $c$ has a rounded base, and within the groove $c$ is a split ring $d$, overhung by the outer wall of the groove $c$ and having a rounded periphery fitting the rounded base of the groove $c$. The split ring $d$ has a screw thread formed therein in continuation of the screw thread of the aperture $b$ of the nut $a$. The split ring $d$ is displaced eccentrically by a pin $e$ driven axially into a hole drilled partly in the split ring $d$ and partly in the nut $a$ at the groove $c$ and entirely in the nut $a$ beyond the groove $c$. The split ring $d$ is slightly closed owing to its eccentric location in the groove $c$.

Figure 1:
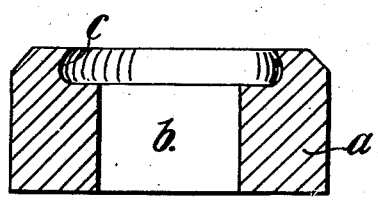
Fig. 1 is an axial section of a nut blank formed with an overhanging annular groove at one end of its aperture.
Figure 2:
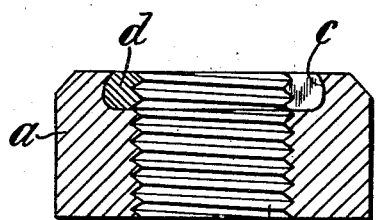
Fig. 2 is an axial section, on the line 2—2 of Fig. 3, of a nut with a split ring assembled in an overhanging groove at one end of its aperture, and after both the nut and the split ring have been tapped with a screw thread.
Figure 3:
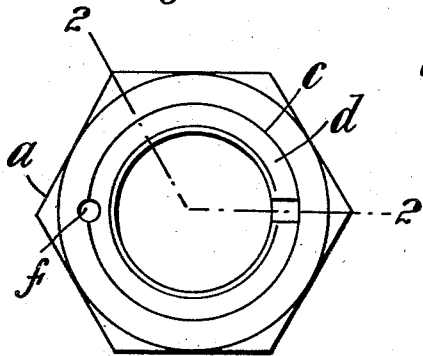
Fig. 3 is a corresponding plan.

The locking nut can be manufactured and assembled as follows:

An ordinary nut blank $a$, Fig. 1, of usual or of reduced axial depth, as shown, has at the chamfered end an annular groove $c$ of rounded cross section formed in the outer end of its aperture $b$ to a depth of about half the thickness of the wall of the nut $a$ measured at the flats. The groove $c$ is of an axial depth such that by the transverse curvature thereof the groove $c$ has a slightly overhanging mouth, i. e., the diameter of the mouth of the groove $c$ is less than the diameter of the groove behind its mouth. The split ring $d$ having a correspondingly rounded periphery and initially closed to an external diameter just to pass into the constricted mouth of the groove $c$, is then expanded in the groove $c$, by driving a tapered drift axially thereinto whilst rotating the drift. Such rotation prevents the formation of, or removes, any excrescences in the aperture $b$ of the nut $a$ or in the aperture of the ring $d$, which might cause defects in the subsequently formed screw thread in either of these, and also permits steel of higher tensile strength to be used for the ring $d$. Diametrically opposite the split of the split ring, a hole $f$ is drilled in the axial direction in the grooved end face of the nut $a$ and in the end face of the split ring $d$, where these meet at the overhanging mouth of the groove $c$, for later a pin $e$ to be inserted therein to hold the ring $d$ against rotation in the nut $a$. The nut $a$ is then held in a socket (not shown) having a nib (not shown) projecting into the split of the ring $d$ to prevent relative rotation of the nut $a$ and ring $d$. The nut $a$ and the ring $d$ held against rotation are then tapped by a parallel screw tap, preferably .002 inch oversize, or by a similar tapered screw tap with a minus leading end, inserted from the ungrooved, usually unchamfered, base end of the nut $a$, and if tapered only entered by its tapered tip in the split ring $d$. The tap is removed by reverse rotation. The nut $a$ and ring $d$ are then in the condition shown in Figs. 2 and 3. The above mentioned pin $e$ is then driven into the axial hole $f$ and causes the ring $d$ to assume an eccentric position in the groove $c$ and contract in diameter, its split becoming more closed. The resulting decreased diameter of the screw thread of the split ring $d$ is preferably such that the ring $d$ fits a screw threaded stem having the smallest tolerated or less diameter of screw thread.

The axial pin $e$ used to hold the split ring against rotation, besides displacing the split ring $d$ eccentrically, prevents radial expansion thereof at this point, which causes the ring $d$ additionally to bind on a screw threaded stem.

To avoid the nut being placed on a screw stem with the split ring $d$ leading, the axial pin $e$ may, as shown, project slightly with a small shallow head from the respective face of the nut $a$ so as to discourage this face being applied to the work, and to prevent the ring leaving the groove.

The screw thread may be V, square or otherwise, a V screw thread being shown in the drawing.

I claim:

1. A locking nut having within one end of its screw threaded aperture an annular groove, a split ring located in and overhung by the mouth of said groove and presenting an aperture screw threaded in continuation of the screw thread of said screw-threaded aperture of said nut, and a pin located in an axial hole partly in said grooved end of said nut and partly in said split ring diametrically opposite the split thereof and displacing eccentrically and constricting said split ring.

2. A locking nut having within one end of its screw threaded aperture an annular groove with a rounded base at the radially outermost surface, a split ring having a rounded periphery fitting said rounded base located in and overhung by the mouth of said groove and presenting an aperture screw threaded in continuation of the screw thread of said screw-threaded aperture of said nut, and a pin located in an axial hole partly in said grooved end of said nut and partly in said split ring diametrically opposite the split thereof and displacing eccentrically and constricting said split ring.

WALTER CLAY PETERS.